US011137655B2

(12) United States Patent
Parsons et al.

(10) Patent No.: US 11,137,655 B2
(45) Date of Patent: Oct. 5, 2021

(54) RESONANT LIQUID CRYSTAL DEVICES

(71) Applicant: Facebook Technologies, LLC, Menlo Park, CA (US)

(72) Inventors: Maxwell Parsons, Seattle, WA (US); Shane Colburn, Redmond, WA (US); Yingfei Jiang, Redmond, WA (US); Andrew Maimone, Duvall, WA (US); Erik Shipton, Kenmore, WA (US); Guohua Wei, Redmond, WA (US); Oleg Yaroshchuk, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/839,634

(22) Filed: Apr. 3, 2020

(65) Prior Publication Data

US 2021/0255490 A1    Aug. 19, 2021

Related U.S. Application Data

(60) Provisional application No. 62/976,788, filed on Feb. 14, 2020.

(51) Int. Cl.
*G02F 1/1335* (2006.01)
*G02F 1/137* (2006.01)
(Continued)

(52) U.S. Cl.
CPC ............ *G02F 1/137* (2013.01); *G02F 1/1337* (2013.01); *G02F 1/133553* (2013.01);
(Continued)

(58) Field of Classification Search
None
See application file for complete search history.

(56) References Cited

U.S. PATENT DOCUMENTS

| 5,552,912 | A | 9/1996 | Sharp et al. |
| 6,292,240 | B1 * | 9/2001 | Kamiya ............ G02F 1/133553 |
| | | | 349/110 |

(Continued)

OTHER PUBLICATIONS

Colburn, S. et al. Tunable metasurfaces via subwavelength phase shifters with uniform amplitude. Sc. Rep. 7, 40174; doi: 10.1038/srep40174 (2017).

(Continued)

*Primary Examiner* — James A Dudek
(74) *Attorney, Agent, or Firm* — Pequignot + Myers; Matthew A. Pequignot

(57) ABSTRACT

A tunable liquid crystal (LC) device includes an LC layer between a pair of reflectors forming an optical cavity. The reflectors include conductive layers for applying an electrical signal to the LC layer. One of the conductive layers may include an array of conductive pixels for spatially selective control of the effective refractive index of the LC layer. The phase delay introduced by the LC layer may be greatly increased or magnified by placing the LC layer into the optical cavity. This enables a substantial reduction of the LC layer thickness, which in its turn enables very tight pitches of the LC pixels, with a reduced inter-pixel crosstalk caused by fringing electric fields, as well as faster switching times. A tight-pitch, fast LC device may be used as a configurable hologram or a spatial light modulator.

19 Claims, 14 Drawing Sheets

(51) Int. Cl.
G02F 1/1343 (2006.01)
G02F 1/1337 (2006.01)
G03H 1/22 (2006.01)

(52) U.S. Cl.
CPC ..... *G02F 1/134309* (2013.01); *G03H 1/2205* (2013.01); *G03H 1/2294* (2013.01); *G02F 1/13706* (2021.01); *G02F 1/13712* (2021.01); *G02F 1/133742* (2021.01); *G02F 1/133746* (2021.01); *G02F 1/133749* (2021.01); *G03H 2225/22* (2013.01)

(56) References Cited

U.S. PATENT DOCUMENTS

| | | | |
|---|---|---|---|
| 2004/0008397 A1 | 1/2004 | Noonan | |
| 2011/0317111 A1* | 12/2011 | Tatsumi | G02F 1/133555 349/113 |
| 2016/0291405 A1 | 10/2016 | Frisken et al. | |

OTHER PUBLICATIONS

PCT/US2021/017617 Search Report dated May 19, 2021.
PCT/US2021/017617 Written Opinion dated May 19, 2021.

* cited by examiner

RESONANT LIQUID CRYSTAL DEVICES

REFERENCE TO RELATED APPLICATION

The present application claims priority from U.S. Provisional Application No. 62/976,788 entitled "RESONANT LIQUID CRYSTAL DEVICES", filed on Feb. 14, 2020, and incorporated herein by reference in its entirety.

TECHNICAL FIELD

The present disclosure relates to tunable optical devices, and in particular to tunable liquid crystal devices, as well as display panels, spatial light modulators, beam steering devices, etc., based on tunable liquid crystal devices.

BACKGROUND

Head mounted displays (HMDs), helmet mounted displays, near-eye displays (NEDs), stereoscopic displays, and other types of displays are used for displaying content, e.g. virtual reality (VR) content, augmented reality (AR) content, mixed reality (MR) content, etc. Such displays are finding applications in diverse fields including entertainment, education, training, engineering, biomedical science, to name just a few examples. The displayed VR/AR/MR content can be three-dimensional (3D) to enhance the experience and to match virtual objects to real objects observed by the user.

Compact display devices are desired in many applications, especially for head-mounted displays. Because a display of an HMD or NED is usually worn on the head of a user, a large, bulky, unbalanced, and/or heavy display device would be cumbersome and may be uncomfortable for the user to wear. Miniature liquid crystal panels may be used for image generation in HMD or NED. It may be desirable to improve spatial resolution and switching speed of liquid crystal panels and other devices based on tunable liquid crystal cells to enable a broader range of display applications.

BRIEF DESCRIPTION OF THE DRAWINGS

Exemplary embodiments will now be described in conjunction with the drawings, in which.

DETAILED DESCRIPTION

Figure 1:
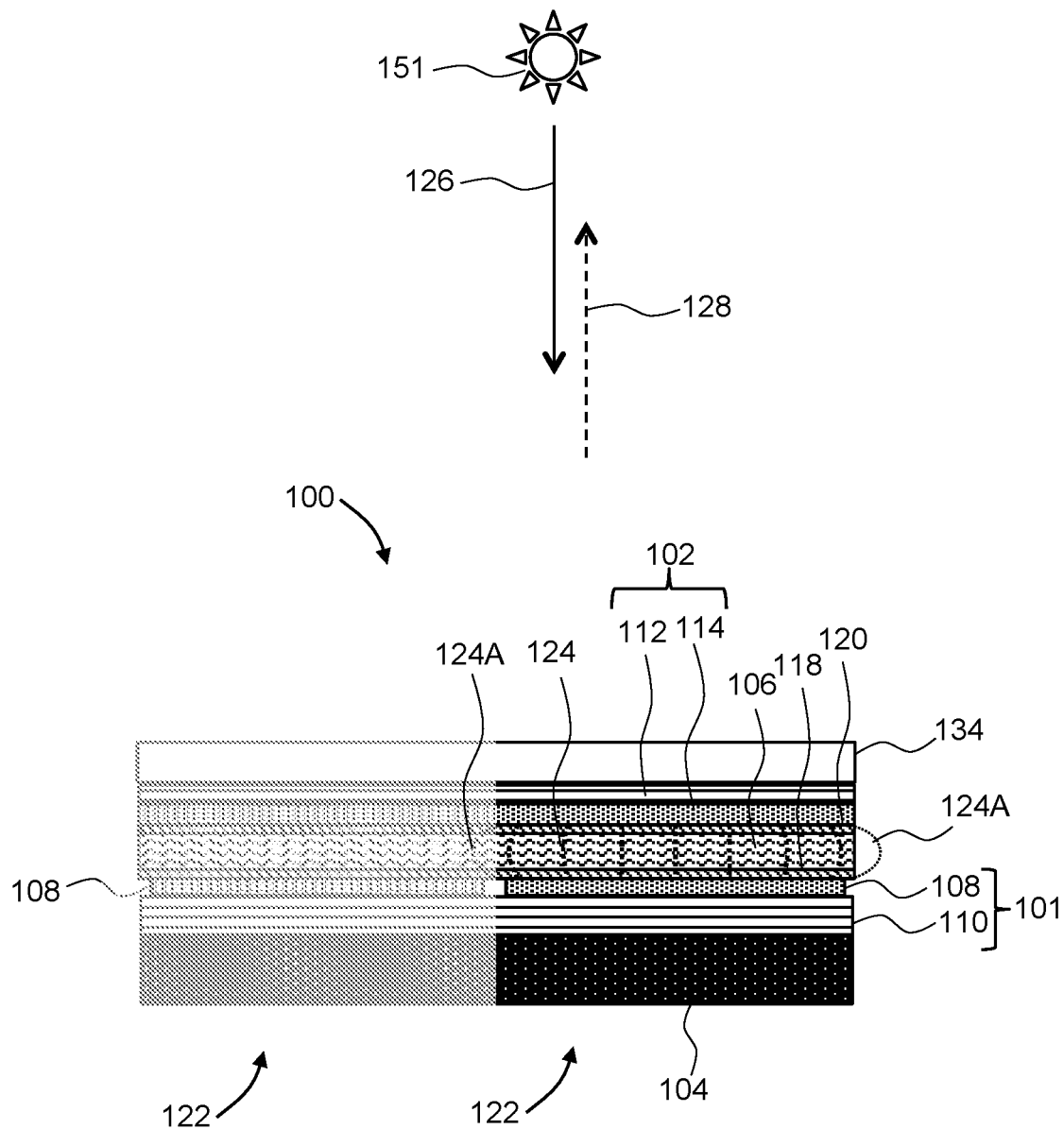
FIG. 1 is a side cross-sectional view of a liquid crystal (LC) device of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In a liquid crystal (LC) cell, an electric field is applied to control orientation of LC molecules in a thin LC layer. An array of transparent electrodes may be provided at one of the sides of the LC layer. A single transparent electrode may be provided at the other side of the LC layer. Such electrode structure—with one common continuous electrode and one segmented electrode—may be used to apply electric field to the LC layer in a spatially selective manner. The pitch of the array of transparent electrodes depends on the spatial resolution required. At low end, the pitch is limited by the LC layer thickness. When the pitch is small compared to thickness, electric field fringes out into neighboring pixels causing crosstalk between neighboring LC pixels.

The required thickness of the LC layer is determined by the effective refractive index variation of LC at different orientations of the LC molecules caused by varying an amplitude of the applied electrical signal. A typical value of the refractive index variation $\Delta n$ is about 0.2-0.3. An LC cell often needs to provide a half-wave ($\pi$) to a full-wave ($2\pi$) of phase shift of the impinging light in most applications. To provide that phase shift in a single pass of light across the LC cell, the thickness of a typical LC layer needs to be at least ~1.5 micrometers. The requirement of minimum LC layer thickness may go against a requirement of tight pixel pitch. For example, the pixel pitch required for wide angle beam steering and holographic applications is approximately 300 nm to 500 nm, with useful thickness range extending to approximately 3 micrometers, which is smaller than a typical LC layer thickness of 5-6 micrometers. For tight-pitch LC cells, an aspect ratio, defined as a ratio of thickness to pitch, may be higher than 1. At aspect ratios higher than 1, strong fringe fields are created at pixel electrode boundaries, resulting in significant crosstalk between neighboring pixels of an LC array.

In accordance with the present disclosure, the required LC layer thickness may be reduced by placing an electrically responsive LC layer in a condition of optical resonance. By way of a non-limiting example, the LC layer may be placed in an optical cavity or resonator formed by a pair of reflectors on both sides of an LC layer. Light entering the optical cavity may propagate multiple times inside the optical cavity, effectively increasing the achievable phase shift of output light. The increased phase shift results in a considerable reduction of the required LC layer thickness, enabling smaller pitches and faster switching times.

In accordance with the present disclosure, there is provided a tunable liquid crystal (LC) device comprising a first substrate and a first reflector over the first substrate. The first reflector comprises a first electrode layer. An LC layer is disposed over the first reflector. A second reflector is disposed over the LC layer. The second reflector comprises a second electrode layer. A second substrate is disposed over the second reflector. The LC layer is tunable by applying an electrical signal to at least one of the first or second electrode layers. Herein, the term "over" is w.r.t. the substrate and not gravity. In other words, it does not assume a particular orientation of the substrate. The first substrate may include e.g. a silicon substrate supporting a circuitry for providing the electrical signal for tuning the LC layer.

In some embodiments, LC device may further include a first alignment layer between the first reflector and the LC layer, and a second alignment layer between the LC layer and the second reflector. In embodiments where the LC layer comprises a nematic LC with positive dielectric anisotropy, the first and second alignment layers may be configured to uniformly align the LC with a pretilt angle of less than 10 degrees; or, for example, the first alignment layer may be configured to align the LC with a first pretilt angle of less than 10 degrees, and the second alignment layer may be configured to align the LC with a second pretilt angle of greater than 85 degrees, causing the LC to adopt a hybrid orientational configuration. In embodiments where the LC layer comprises a nematic LC with negative dielectric anisotropy, the first and second alignment layers may be configured to homeotropically align the LC with a pretilt angle of greater than 85 degrees.

In some embodiments, the LC layer has a thickness of 2 micrometers or less. The first reflector may be a full reflector, and the second reflector may be a partial reflector, e.g. with reflectivity of at least 6%. A reflectivity of the partial reflector may be less than a reflectivity of the full reflector minus a round-trip absorption loss in an optical cavity formed by the full and partial reflectors. The partial reflector may include a distributed Bragg reflector, a high-contrast subwavelength grating, a metasurface that comprises at least one of dielectric or metallic subwavelength structures, and so on.

The first electrode layer may include an array of conductive layer segments. At least some conductive layer segments of the array of conductive layer segments may be independently energizable by applying electrical signals to the segments. The array of conductive layer segments may have a pitch of 2 micrometers or less. The array of conductive layer segments may include a conductive oxide having at least 50% transmission of visible light. At least some conductive layer segments of the array of conductive layer segments may be reflective. In some embodiments, the full reflector further comprises a reflective layer supported by the first substrate, where each conductive layer segment of the array of conductive layer segments is supported by the reflective layer. The reflective layer may include at least one of: a distributed Bragg reflector; a subwavelength grating; or a metasurface comprising at least one of dielectric or metallic subwavelength structures.

In accordance with an aspect of the present disclosure, there is provided a configurable hologram based on a tunable LC device disclosed herein.

In accordance with an aspect of the present disclosure, there is further provided a system comprising a tunable LC device disclosed herein and a light source coupled to the LC device for providing a light beam to the LC device, which may be configured to spatially modulate the light beam in at least one of phase or amplitude by applying electrical signals to conductive layer segments of the array of conductive layer segments. An optics block may be disposed downstream of the LC device and configured to redirect the spatially modulated light beam for forming an image.

Referring now to FIG. 1, an LC device 100 of this disclosure includes a bottom (first) substrate 104, a first reflector, e.g. a full reflector 101 over the bottom substrate 104, an LC layer 106 over the full reflector 101, a second reflector, e.g. a partial reflector 102 over the LC layer 106, and an optional top (second) substrate 134. Herein, the term "full reflector" means a reflector that reflects most of the impinging light, such that transmission of the impinging light through the full reflector is negligible. Accordingly, the term "partial reflector" means a reflector that reflects only a portion of the impinging light and lets a non-negligible portion of the impinging light to propagate through the partial reflector. The portion of light reflected by the partial reflector is also a non-negligible portion, that is, it is more than a small portion of light reflected at an optical interface where the refractive index is not perfectly matched, or where an anti-reflection (AR) coating is not provided. For certainty, the non-negligible portion of light is at least 6%; or in some embodiments at least 12% of the impinging light's optical power. In other words, the reflectivity of the partial reflector is at least 6%; or in some embodiments, at least 12%. It is to be noted that the full and partial reflectors are not necessarily single elements, and may each include a plurality of layers or components for performing various functions, such as reflecting light, conducting electricity, etc.

In the configuration shown in FIG. 1, the LC layer 106 is confined between the bottom (first) 118 and top (second) 120 alignment layers supported by the full 101 and partial 102 reflectors which, in their turn, are supported by the bottom 104 and top 134 substrates, respectively. The gap between the bottom 118 and top 120 alignment layers may be maintained by spacers, e.g. glass beads or microfabricated spacers or spacer arrays, not shown. The bottom 104 and top 134 substrates with all the intermediate layers, including the LC layer 106, are termed LC cell. In this embodiment, the LC layer 106 is a thin layer of anisotropic fluid in an aligned monodomain state. The alignment configuration of LC in the cell can be antiparallel, parallel, vertical, twisted, etc. The heterogeneous configurations of the LC layers are also possible, for example, in different composite systems such as polymer-dispersed LC (polymer dispersions of LC droplets), polymer network LC (LC with polymer network formed in it), filled LC (LC filled with nanoparticles), etc. The polymer-dispersed LC may be used to provide, for example, a spatial modulation of amplitude of a light beam.

The full reflector 101 may include a first electrode layer for applying electric field to the LC layer 106. In the embodiment shown, the first electrode layer includes an array of co-planar conductive layer segments 108 supported by a fully reflective layer 110. The array may be one-dimensional, i.e. extend in one direction, or two-dimensional, i.e. extend in two perpendicular directions in plane of the segmented conductive layer. The conductive layer segments 108 may propagate at least 50% of impinging visible light, for example. Such layers, propagating at least 50% of impinging light, are termed herein "transparent", i.e. the term "transparent" includes translucent, for brevity. The partial reflector 102 may include a partially reflective layer 112 supported by a common transparent electrode layer 114. The conductive layer segments 108 define an array of LC pixels 122, which may be one-dimensional or two-dimensional. The LC pixels 122 may be individually addressable or energizable, i.e. may be supplied with individual independent electrical signals, e.g. voltage, for independent control of the underlying portion of the LC layer 106. To that end, individual LC pixels may be equipped with one or several thin film transistors (TFTs; not shown in FIG. 1 for brevity) configured to open or lock a corresponding LC pixel. Together, the TFTs may be disposed in a matrix configuration on one of the substrates 104 or 134. In displays, such a configuration is termed active matrix LC display (AMLCD).

The bottom 118 and top 120 alignment layers may be provided at the boundary between the LC layer 106 and the segmented 108 and common 114 transparent electrode layers, respectively, to provide pre-determined alignment of LC molecules at the respective boundaries. The conductive layer segments 108 and/or the common electrode layer 114 may be made of a conductive oxide material, e.g. indium tin oxide (ITO) or another conductive oxide such as indium zinc oxide, aluminum zinc oxide, barium stannate, strontium vanadate, calcium vanadate, etc. As noted above, the term "transparent" is understood herein to mean fully or partially transparent, i.e. translucent, e.g. at least 50%; 60%; 70%; 80%; 90% optical power transmission of visible light. It is also to be noted that the term "layer" does not necessarily mean a single layer, but may also denote a layer including a stack of sub-layers.

In operation, an electrical signal, e.g. voltage, may be applied between the segmented 108 and common 114 transparent electrode layers. The applied voltage creates an electric field 124, which reorients the LC molecules in the LC layer 106, thereby changing an effective refractive index for an impinging light beam 126 emitted by a light source 151, and varying the phase delay of a reflected output light beam 128. The electric field 124 is directed substantially vertically in FIG. 1, that is, perpendicular to the plane of the LC layer 106, except for fringe fields 124A at boundaries between the LC pixels 122. The magnitude of the fringe fields 124A depends upon the aspect ratio of the LC pixels 122. The aspect ratio is defined as the ratio of thickness d of the LC layer 106 to the LC pixel pitch p. The LC layer 106 thickness is also termed cell gap. When the aspect ratio is large enough, i.e. when the LC pixel pitch p is similar in magnitude or smaller than the cell gap d, the fringe fields 124A may be unacceptably large in that they drive the LC molecules of the neighboring LC pixels 122, causing undesired crosstalk between the neighboring LC pixels 122. In some embodiments, the pitch of the conductive layer segments 108, and accordingly the pitch of the LC pixels 122, is less than 2 micrometers; less than 1 micrometer; less than 500 nm; or even less than 300 nm for wide-angle beam steering and holographic applications, for example.

The full 101 and partial 102 reflectors form an optical cavity, i.e. a Fabry-Perot etalon or optical resonator. The LC layer 106 is disposed in the optical cavity formed by the full 101 and partial 102 reflectors. The impinging light beam 126 may propagate multiple times in the optical cavity by reflecting from the full 101 and partial 102 reflectors, effectively increasing the achievable phase shift of the output light beam 128. This enables the cell gap d to be considerably reduced, thereby reducing the fringe electric fields 124A and associated crosstalk, and reducing switching time.

In some embodiments, the substrate 104 may be an active substrate, e.g. a silicon substrate supporting a circuitry for providing the electrical signal for tuning the LC layer 106. The active substrate further enables miniaturization and integration of the LC device into a compact spatial light modulator, a configurable hologram, a display panel, etc. Other active types of substrates may include, for example and without limitation, active-matrix TFTs on a glass or similar transparent or non-transparent substrate.

It is to be understood that the structure of the LC device 100 shown in FIG. 1 is only meant as an example. Many variants of the reflectors 101, 102, the LC layer 106, and the reflective layers 110, 112, etc. are possible. Some of these variants are considered in more detail further below.

Figure 2A:
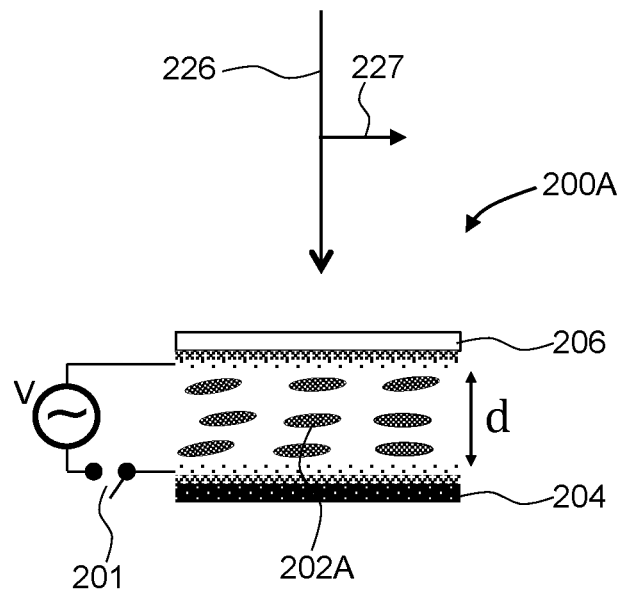
FIGS. 2A and 2B are side cross-sectional views of an LC device of this disclosure in OFF and ON states, respectively, the LC having positive dielectric anisotropy.
Figure 2B:
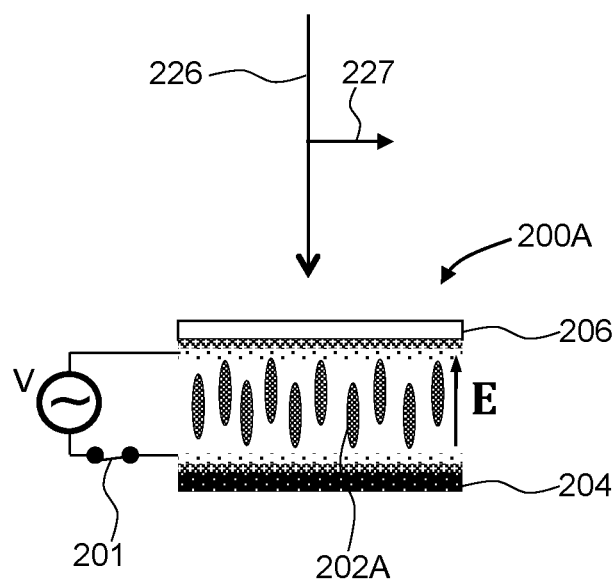

A basic operation of LC cells with nematic type LCs is illustrated in FIGS. 2A, 2B, 2C, and 2D. FIGS. 2A and 2B depict an LC cell 200A having nematic LC molecules with positive dielectric anisotropy. A voltage V may be applied to an LC cell 200A by means of a switch 201. When the switch 201 is open (FIG. 2A), no voltage is applied, and LC molecules 202A assume orientation close to a horizontal orientation in FIG. 2A, i.e. nearly parallel to LC cell 200A substrates 204, 206, forming a planar configuration. The orientation is defined by alignment layers, which may be configured, e.g. buffed or irradiated with polarized UV light, to orient adjacent LC accordingly. When the switch 201 is closed (FIG. 2B), the voltage V is applied to the LC cell 200A, the LC molecules 202A become oriented along the electric field E, i.e. nearly perpendicular to the substrates 204, 206, causing a change of an effective refractive index for an impinging light beam 226 polarized in-plane of FIG. 2A as shown with an electric field vector 227. The reorientation of the LC molecules 202A is caused by an electrostatic interaction between the applied electric field and an electrical dipole induced by the electric field in the LC molecules 202A. It is to be further noted that the applied voltage V is preferably alternate-current (AC) voltage, for both LC cells 200A and 200C. Using AC voltage as opposed to a direct current (DC) voltage facilitates the reduction of undesired electrochemical effects at layer interfaces. The maximum change of optical path length $\Delta L_{max}$ achievable in the LC cell 200A is given by $$\Delta L_{max} = (n_e - n_o)d \tag{1}$$

$n_e$ and $n_o$ are extraordinary and ordinary refractive indices, respectively, of the LC, and d is the cell gap (FIG. 2A).

Figure 2C:
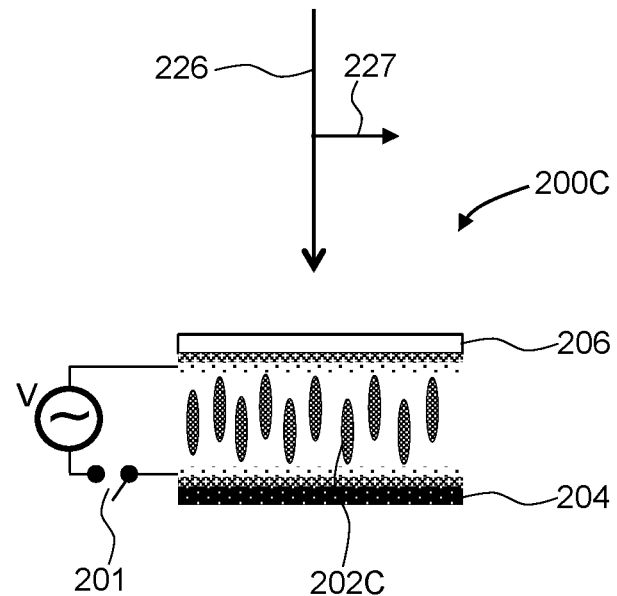
FIGS. 2C and 2D are side cross-sectional views of an LC device of this disclosure in OFF and ON states, respectively, the LC having negative dielectric anisotropy.
Figure 2D:
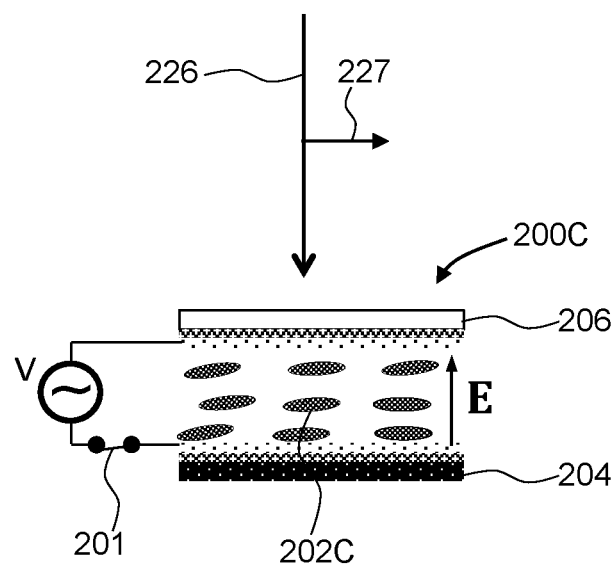

FIGS. 2C and 2D refer to an LC cell 200C having nematic LCs with negative dielectric anisotropy. When the switch 201 is open (FIG. 2C), no voltage is applied, and LC molecules 202C assume orientation close to vertical, i.e. nearly perpendicular to LC cell 200C substrates 204, 206, forming an anti-parallel tilted homeotropic configuration in absence of the electrical signal. The orientation is defined by alignment layers configured to facilitate a vertical orientation of the LC molecules 202C. When the switch 201 is closed (FIG. 2D), the voltage V is applied to the LC cell 200C, the LC molecules 202C become oriented perpendicular to the electric field E, i.e. nearly parallel to the substrates 204, 206, causing a change of an effective refractive index for an impinging light beam 226 polarized in-plane of FIGS. 2C and 2D as shown with the optical electric field vector 227.

Figure 3:
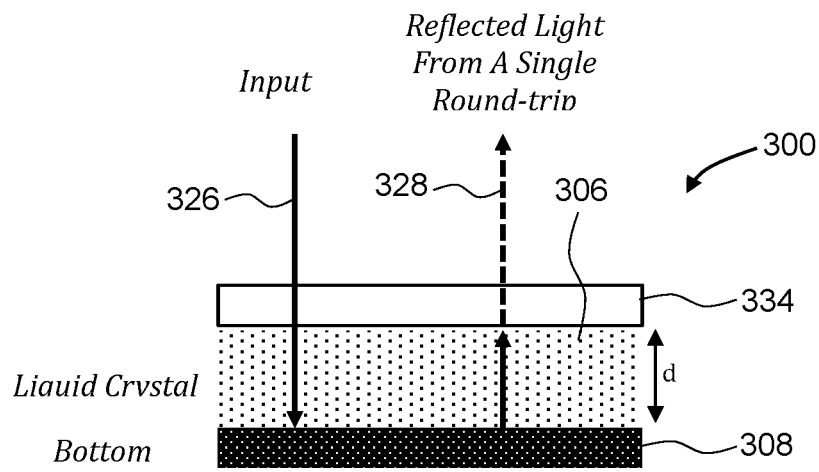
FIG. 3 is a schematic side diagram of a single-pass reflective LC cell.

FIG. 3 shows a single-pass reflective LC cell 300, which may include nematic LCs with positive or negative dielectric anisotropy, such as the LC cells 200A or 200C of FIGS. 2A-2B or FIGS. 2C-2D, respectively. The single-pass reflective LC cell 300 of FIG. 3 includes an LC layer 306 over a full reflector 308, and a top substrate 334 over the LC layer 306. An impinging light beam 326 propagates through the LC layer 306, is reflected by the full reflector 308, propagates back through the LC layer 306, doubling the phase delay introduced by the LC layer 306 on a first pass, and exits the single-pass reflective LC cell 300 as an output light beam 328 (shifted laterally for clarity). Transparent electrodes, not shown, may be provided to vary the optical phase delay introduced by the LC layer 306.

Figure 4:
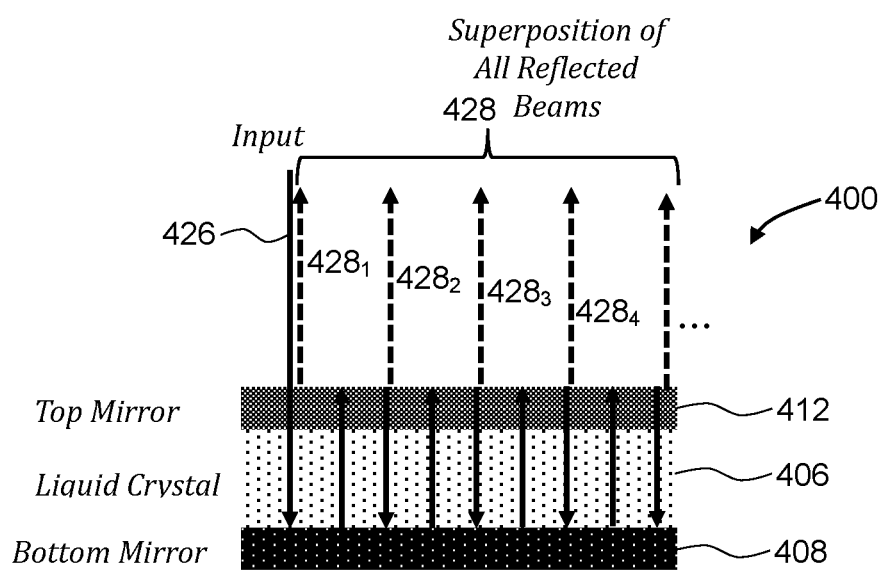
FIG. 4 is a schematic side diagram of a multipass reflective LC cell having a top partial reflector.

FIG. 4 shows a resonant multipass reflective LC cell 400, which may include nematic LCs with positive or negative dielectric anisotropy, as in the LC cells 200A and 200C, respectively, of FIGS. 2A to 2D considered above. The resonant multipass LC cell 400 of FIG. 4 includes an LC layer 406 between a bottom reflector 408 and a top partial reflector 412 forming an optical resonator, or optical cavity. Transparent electrodes, not shown, may be provided to vary the optical phase delay introduced by the LC layer 406 on a single pass.

In operation, an impinging light beam 426 is partially reflected by the top partial reflector 412, forming a first sub-beam $428_1$. The remaining portion of the impinging light beam 426 propagates through the LC layer 406, is reflected by the full reflector 408, propagates through the LC layer 406 again, and is partially reflected to propagate back through the LC layer 406. Thus, multiple sub-beams $428_1$, $428_2$, $428_3$, $428_4$, . . . are formed. The sub-beams $428_1$, $428_2$, $428_3$, and $428_4$ are shown offset for clarity; in an actual device they may be superimposed, forming an output light beam 428. The phase shift of the output light beam 428 is determined by the phases of individual sub-beams beams $428_1$, $428_2$, $428_3$, $428_4$, . . . . When certain conditions are met, the phase shift of the output light beam 428 may be much larger than the phase shift of the output light beam 328 of FIG. 3 upon a double pass propagation through the LC layer 306. At high reflectivity values, a very small variation of the cavity phase around the value of π (a resonance condition) results in a significantly larger variation of the output phase shift, enabling the cell gap of the LC cell 400 to be considerably reduced.

The response time of the LC cell 400 is given by $$\tau_r = \frac{\tau_0}{|(V/V_{th})^2 - 1|}, V_{th} = \pi\sqrt{\frac{K_{33}}{\varepsilon_0|\Delta\varepsilon|}}. \quad (2)$$

where $$\tau_0 = \frac{\gamma_1}{K\pi^2}\left(d^2 + \frac{4dK}{W}\right) \approx \frac{\gamma_1 d^2}{K\pi^2} \quad (3)$$

where V is driving voltage, K is a constant of orientational elasticity, γ is a rotational viscosity, W is an anchoring coefficient, d is the cell gap, and Δε is the dielectric anisotropy. It follows from Eqs. (2)-(3) that, at typical values of the above parameters, a ×40 times improvement of the cell gap would give about 8 kHz refresh rate. This could enable color-sequential LC on silicon (LCoS) displays at high refresh rates. Cell gaps d as small as 2 micrometers; 1 micrometer; 500 nanometers; and even as low as 300 nanometers may provide a phase delay of at least π, or even at least 2π, within a visible spectrum ranging from 380 nm to 720 nm, and/or within a near-infrared spectrum from 740 nm to approximately 1100 nm, for example. The small cell gaps may afford tight pixel pitches of less than 2 micrometers; less than 1 micrometer; less than 500 nm; or less than 300 nm in some embodiments.

Figure 5A:
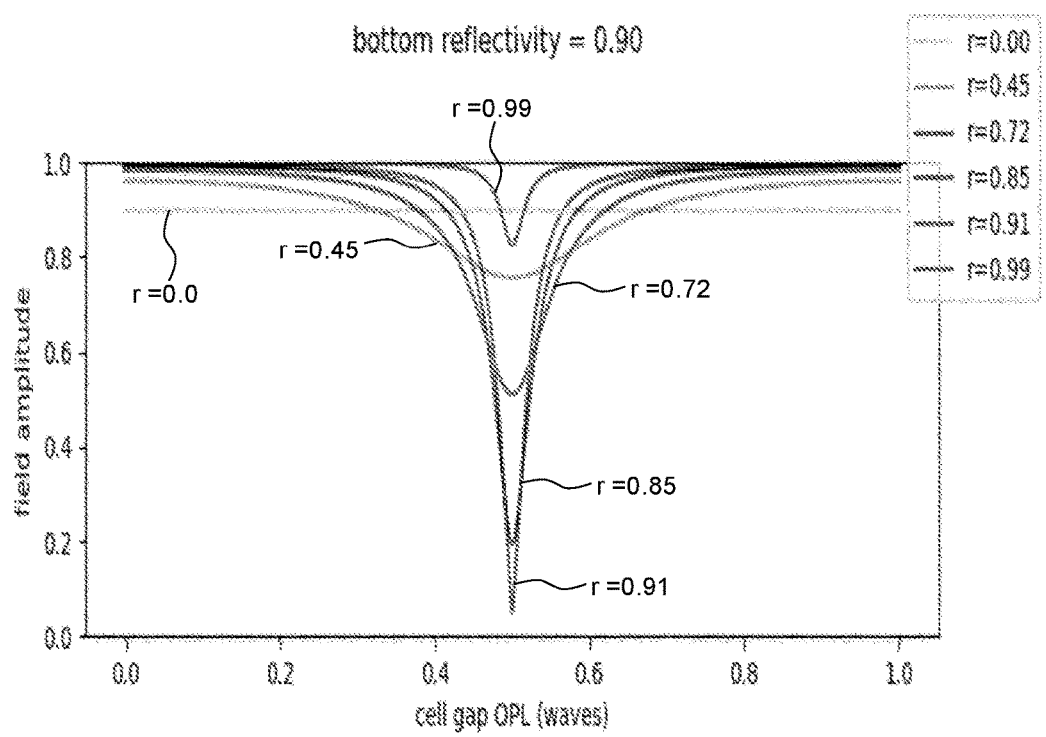
FIGS. 5A and 5B are graphs of output field amplitude and phase shift, respectively, as a function of optical path length of the LC devices of FIGS. 1 and 4 at different values of reflectivity of the top reflector and a non-zero cavity loss.
Figure 5B:
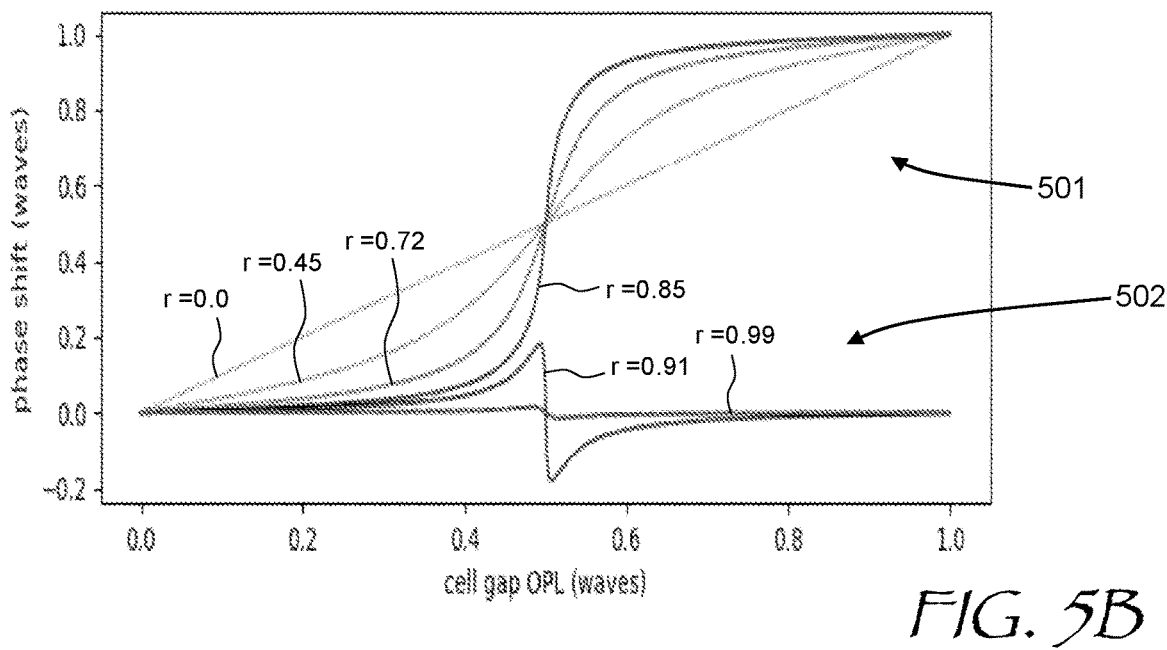

Dependence of the output phase on the cavity phase of the resonant multipass reflective LC cell 400 of FIG. 4 in presence of optical losses is illustrated in FIGS. 5A and 5B. Round-trip cavity losses, e.g. due to a non-zero round-trip absorption of the top and bottom transparent electrodes, have been rolled into the bottom mirror reflectivity for convenience of calculation and illustration. In this particular example, the round-trip absorption losses of 10% have been accounted by lowering the reflectivity of the bottom full reflector by 10%, i.e. from 1.0 to 0.9.

In FIG. 5A, the output electric field amplitude is plotted as a function of optical path length (OPL) of the LC layer 306 measured in wavelengths of impinging light, at the values of the top (partial) reflector's reflectivity of zero (for comparison; the zero reflectivity corresponds to the single-pass reflective LC cell 300 of FIG. 3); 0.45; 0.72; 0.85; 0.91; and 0.99 (the non-zero reflectivity corresponds to the resonant multipass reflective LC cell 400 of FIG. 4). At the top reflector's reflectivity of zero, the field amplitude does not depend on the OPL of the LC layer. As the top reflector's reflectivity increases, an absorption peak develops at the OPL value of 0.5, which corresponds to the cavity phase shift of 7C. The amplitude of the peaks increases, while the width of the peaks decreases in going from the top reflectivity of 0.45 to 0.72 to 0.85 to 0.91. Then, the peak amplitude is seen to decrease again at the top reflectivity of 0.99.

In FIG. 5B, the output phase shift is plotted as a function of OPL for the same values of the top mirror's reflectivity. It is seen that the phase graphs break down into two groups corresponding to two operating regimes defined by relationship between top and bottom mirror reflectivities. For a first group 501, the reflectivity of the top reflector is less than the effective reflectivity of the bottom (full) reflector defined as a difference between the reflectivity of full reflector and round-trio absorption losses in the optical cavity formed by the top and bottom reflectors. This operating regime is referred to herein as "over-coupled" operating regime, since at a lower reflectivity of the top reflector, more light is coupled into the optical cavity formed by the top and bottom reflectors. The first group 501 group exhibits a steep slope of the curve around the cavity OPL of 0.5. For a second group 502, the reflectivity of the top reflector is higher than the effective reflectivity of the bottom (full) reflector, i.e. for the second group 502, the reflectivity of the top reflector is greater than the reflectivity of the bottom reflector minus the round-trip optical losses. This operating regime is referred to herein as "under-coupled" operating regime. The slope of the phase curve for under-coupled LC cell is reversed, and is smaller in magnitude, as compared to the slope in the over-coupled LC cell.

Figure 6A:
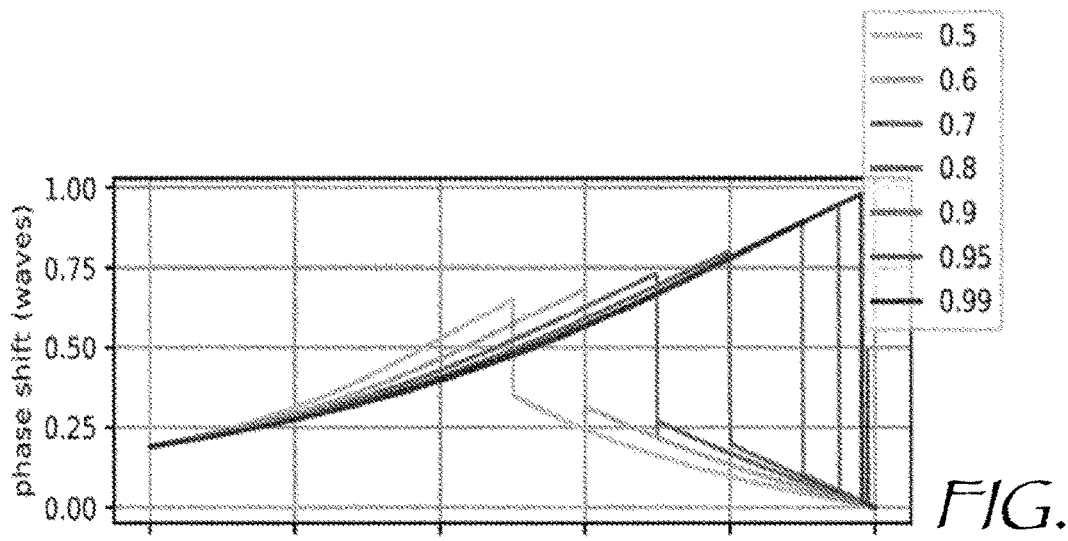
FIGS. 6A, 6B, and 6C are graphs of output phase shift, minimum reflected intensity, and a ratio of minimum to maximum reflected intensity, respectively, as a function of top reflector reflectivity at different values of effective reflectivity of the bottom reflector.
Figure 6B:
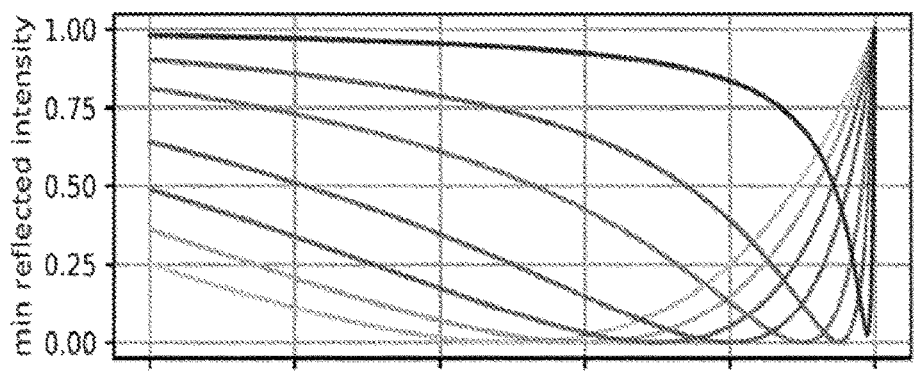
Figure 6C:
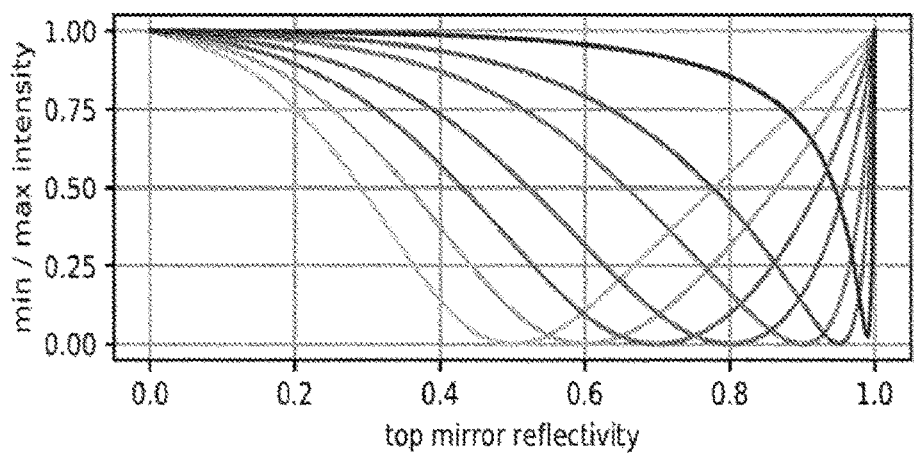

The two operating regimes of the resonant multipass reflective LC cell 400 of FIG. 4 are further illustrated in FIGS. 6A, 6B, and 6C. Referring first to FIG. 6A, the phase shift in wavelengths of the impinging light beam is plotted against the top mirror reflectivity at the effective bottom mirror reflectivity values (i.e. with the round-trip optical losses lumped into the bottom mirror reflectivity) of 0.5; 0.6; 0.7; 0.8; 0.9; 0.95; and 0.99. Each phase shift curve has an abrupt drop when the top mirror's reflectivity reaches the bottom mirror effective reflectivity. To the left of the drop, the resonant LC cell is in over-coupled regime; and to the right of the drop, the resonant LC cell is in under-coupled regime.

For operating a pixelated resonant LC device as a phase-only spatial light modulator, it is desirable to increase the phase shift introduced by the LC device into an optical beam, while avoiding excess optical losses and variations of the reflected beam amplitude as much as possible. In other words, the minimum reflectivity needs to be increased, or at least variations of reflectivity of the LC device need to be lessened. The minimum reflectivity of the LC device is plotted in FIG. 6B against the top mirror reflectivity of the LC device. One can see from comparing FIG. 6B to FIG. 6A that, at low bottom reflectivity values, i.e. high cavity losses, the high reflectivity of the LC device may be achieved by increasing the top mirror's reflectivity, albeit at the account of reduced phase variation. The large phase variation can be achieved simultaneously with the low reflectivity variation, but that requires the bottom mirror's effective reflectivity to be high, i.e. the optical cavity losses need to be low. This conclusion is corroborated by FIG. 6C, which plots the ratio of minimum to maximum reflectivity as a function of the top mirror's reflectivity.

Figure 7A:
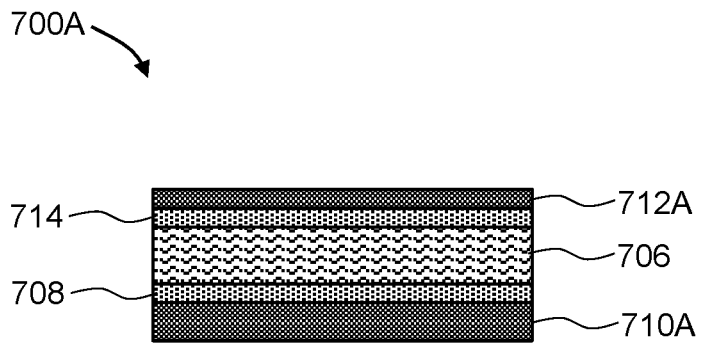
FIG. 7A is a side cross-sectional view of an embodiment of the LC device of FIG. 1 with metal reflectors.
Figure 7B:
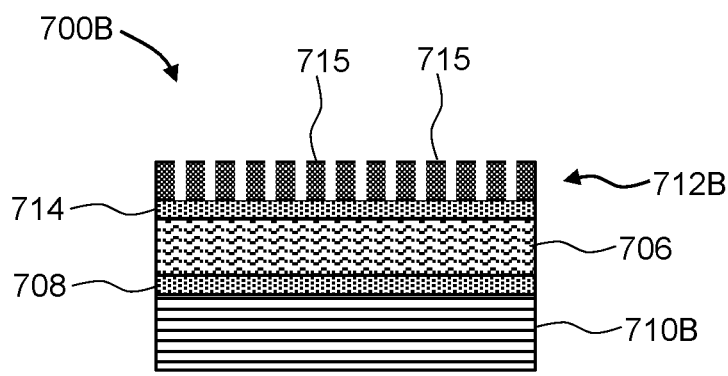
FIG. 7B is a side cross-sectional view of an embodiment of the LC device of FIG. 1 with a reflective high-contrast subwavelength grating used as the top partial reflector.
Figure 7C:
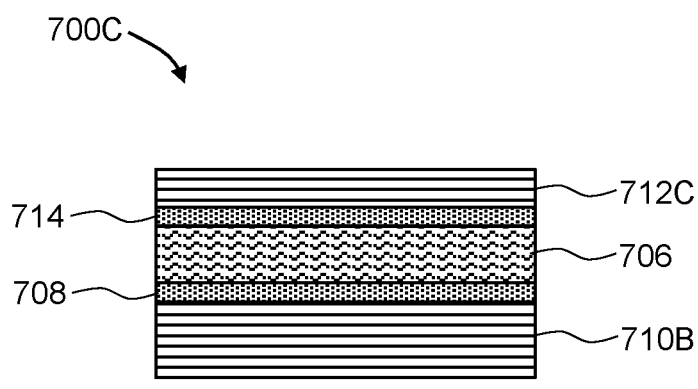
FIG. 7C is a side cross-sectional view of an embodiment of the LC device of FIG. 1 with distributed Bragg reflectors used as full and partial reflectors.

FIGS. 7A to 7C depict some exemplary configurations of a tunable LC device having an LC layer disposed in an optical cavity formed by a pair of reflectors. Referring to FIG. 7A, a tunable LC device 700A includes, in going from bottom to top: a bottom metal mirror 710A, an optional bottom conductive electrode 708, an LC layer 706, a top conductive electrode 714, and a top translucent metal mirror 712A. The LC cell substrates are omitted for simplicity. In an actual device, the bottom metal mirror 710A and the bottom conductive electrode layer 708 may be disposed on opposite sides of one (bottom) transparent substrate; and the top conductive electrode 714 and the top metal translucent mirror 712A may be disposed on opposite sides of another (top) transparent substrate. Metal reflectors may be too lossy for all-phase optical modulators, but may be usable in amplitude modulators. So-called "enhanced metal" coatings, combining a metal layer with a single dielectric layer or a multilayer dielectric overcoat, may be used to enhance reflectivity and provide compatibility with adjoining layers.

Referring to FIG. 7B, a tunable LC device 700B includes a bottom distributed Bragg reflector (DBR) 710B as the full reflector, the bottom conductive electrode 708, the LC layer 706, the top conductive electrode 714, and a high-contrast subwavelength grating 712B as the top partial reflector. The DBR 710B may include a sandwich of layers of alternating refractive index, the layers being parallel to the LC layer 706. The layers form a Bragg grating with a pre-defined reflection coefficient, e.g. 96%-100%, in a wavelength band of interest. In some embodiments, the refractive index difference is less than 0.2, and/or the number of layers is at least 12 layers. The subwavelength grating 712B may use metamaterials to achieve a desired dielectric constant and refractive index at optical frequencies. For example, a metasurface that comprises dielectric or metallic subwavelength structures may be used instead of, or in addition to, the high-contrast subwavelength grating 712B. Sub-wavelength gratings may be thinner than DBR reflectors of a similar reflectivity, but may be more challenging to fabricate, especially on the bottom substrate. Herein, the term "high-contrast" means grating with a refractive index contrast, defined a difference between a diffraction grating fringe refractive index and a substrate/filling material refractive index, of greater than 0.2. As shown in FIG. 7B, fringes 715 of the subwavelength grating 712B extend in plane of the subwavelength grating 712B, and may include lines running parallel to one another and parallel to the LC layer 706, and/or a 2D array of features (e.g. dots, squares, polygons, etc.) having a subwavelength pitch in two dimensions.

Referring to FIG. 7C, a tunable LC device 700C includes the bottom distributed Bragg reflector (DBR) 710B as the bottom full (i.e. 100%) reflector, the bottom conductive electrode 708, the LC layer 706, the top conductive electrode 714, and a top DBR 712C as a partial reflector. The reflectors of FIGS. 7A to 7C may be used in any combination. Furthermore, one or both reflectors may be made of several transparent conductive oxide (TCO) layer in a stack optimized to have a desired value of reflectivity. One advantage of the TCO stack is that the one of, or both reflectors of the reflective LC cell may be used as LC cell electrode(s), resulting in a simpler structure.

Figure 8:
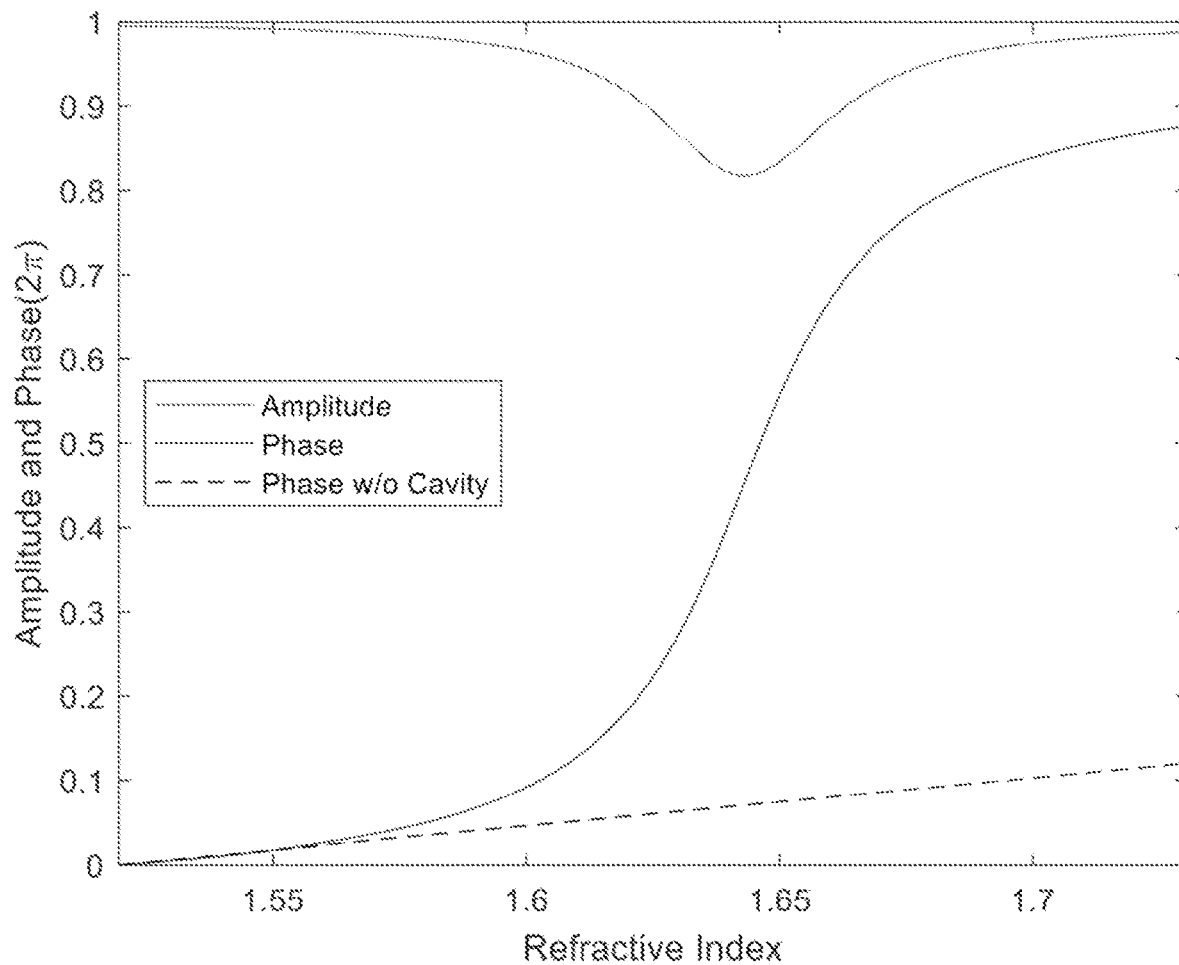
FIG. 8 is a graph of output amplitude and phase of the LC device of FIG. 7C as a function of effective refractive index of the LC material.

Turning to FIG. 8, amplitude and phase of the tunable LC device 700C of FIG. 7C have been calculated as a function of an effective refractive index of the LC layer 706 at the wavelength of 632 nm, with 180 nm thick LC layer 706, 50 nm thick ITO electrodes, the bottom DBR 710B including 10 layer pairs of quarter-wave thick silicon nitride and quarter-wave thick silicon dioxide, and the top DBR 712C including 4 such layer pairs. One can see that the amplitude of the reflected light beam only changes by about 15%, i.e. the optical power of the light beam changes by about 28%, while achieving about 0.88 of the entire full-wavelength phase sweep.

Figure 9A:
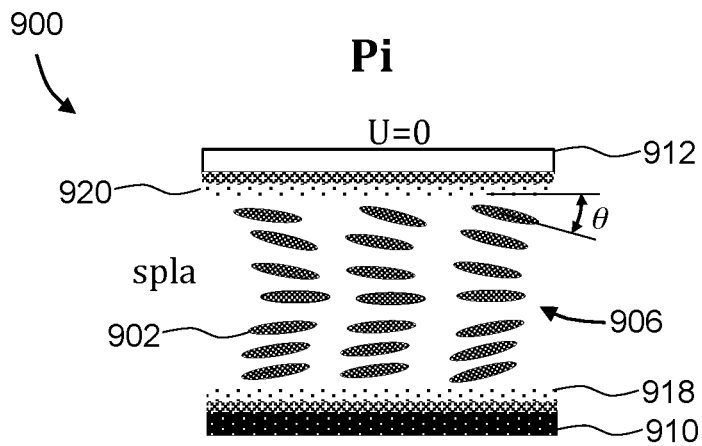
FIGS. 9A, 9B, and 9C are schematic cross-sectional views of an embodiment of the LC device of FIG. 1 with a $\pi$-cell LC configuration at different applied voltages.
Figure 9B:
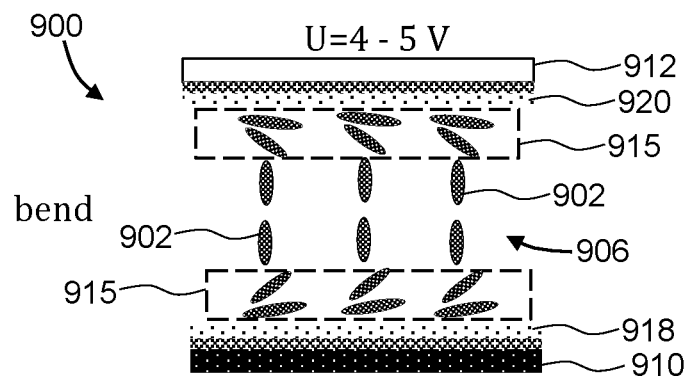
Figure 9C:
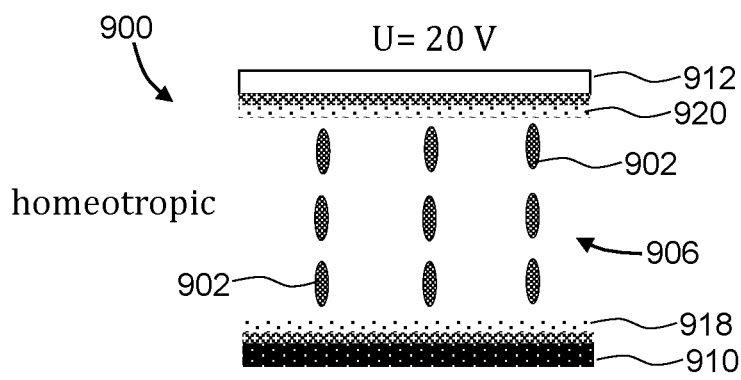

Various types of the LCs and alignment configurations may be used in an intracavity LC cell of this disclosure. FIGS. 9A to 9C depict an LC cell 900 including bottom 910 and top 912 reflective substrates coated with bottom (first) 918 and top (second) 920 alignment layers, respectively. The LC cell 900 is filled with a nematic LC forming an LC layer 906 and comprising elongated LC molecules 902 in a parallel tilted planar alignment configuration, also termed electrically controlled birefringence (ECB) or a π-cell configuration. The bottom alignment layer 918 is disposed between the bottom reflective substrate 910 and the LC layer 906, and the top alignment layer 920 is disposed between the LC layer 906 and the top reflective substrate 912. The orientation of the LC molecules 902 at the absence of driving voltage is determined by the alignment layers 918, 920. In FIGS. 9A to 9C, the LC orientation is shown at different driving conditions: when no voltage applied to an LC layer 906 (FIG. 9A); when 4-5V of voltage applied (FIG. 9B); and when the full voltage of 20V is applied. The orientation of the LC molecules 902 can be characterized by a pretilt angle θ, which is an angle between one of the alignment layers 918, 920 and the LC director (a line drawn along the direction of local alignment of the LC molecules 902) near this alignment layer, with a condition that LC alignment is influenced only by the alignment layer. This condition is fulfilled, for example, in thick LC cells when influence of the second alignment layer near the first one can be ignored. In case of antiparallel alignment in an LC cell with two identical alignment layers, the alignment is uniform across the LC cell such that the tilt angle of LC director is constant and equal to pretilt angle at the aligning layers. In case of parallel configuration presented in FIG. 2A, the tilt angle of LC director is not uniform. Typically, an alignment with a pretilt angle of less than 5-6 degrees is termed planar alignment or tilted planar alignment. When value of the pre-tilt angle Bis greater than 85 degrees, such an alignment is termed vertical or homeotropic or zero-pretilt or tilted vertical alignment.

When no voltage is applied to the LC layer 906 (FIG. 9A), the LC molecules 902 adopt a splay configuration, which is determined by alignment direction and a pretilt angles of the LC molecules 902. At the top surface of the LC layer 906 in FIG. 9A, the LC molecules 902 are pretilted clockwise w.r.t. the top surface, and at the bottom surface of the LC layer 906, the LC molecules 902 are pre-tilted counterclockwise w.r.t. the bottom surface. In this example, the alignment layers 918, 920 are configured to uniformly align the LC with a pretilt angle of less than 10 degrees.

When an intermediate voltage of 4-5V is applied to the LC layer 906 (FIG. 9B), the LC molecules 902 begin to align along the applied electric field, i.e. vertically in FIG. 9B, due to an electric dipole being induced by the electric field along the LC molecules 902, the induced electric dipole being subject to an electrostatic force momentum created by the electric field. The LC molecules 902 disposed close to a middle of the LC layer 906 rotate by a larger angle, being almost vertical, while the LC molecules 902 in boundary areas 915 rotate less due to the alignment forces tending to keep them closer to a horizontal orientation.

When the full voltage of 20V is applied to the LC layer 906 (FIG. 9C), all LC molecules 902 are oriented along the electric field direction, i.e. vertically in FIG. 9C. The voltage-dependent rotation of the LC molecules 902 results in changing an effective refractive index of light polarized along the LC molecules 902 in FIG. 9A, that is, along x-direction in FIG. 9A.

Many other LC configurations and orientations may be used, e.g. an electrically controlled birefringence (ECB) configuration. The ECB configuration is similar to the π-cell configuration, only in ECB configuration, the pre-tilts of the LC molecules at both LC cell interfaces are in a same direction, as shown in FIG. 2A, which depicts an antiparallel configuration of the LC. One more LC configuration is vertical alignment (VA), in which the LC is aligned almost vertically (homeotropically) with small (0.5°-3°) deviation in the same direction at both interfaces. In VA configuration, LC with negative dielectric anisotropy switches by vertically applied electric field from vertical to planar orientation as shown in FIGS. 2C and 2D, i.e. reversely to switching in the ECB configuration shown in FIGS. 2A and 2B. For the homeotropic configuration, the alignment layers 918, 920 may be configured to uniformly align the LC with a pretilt angle of greater than 85 degrees.

Figure 10A:
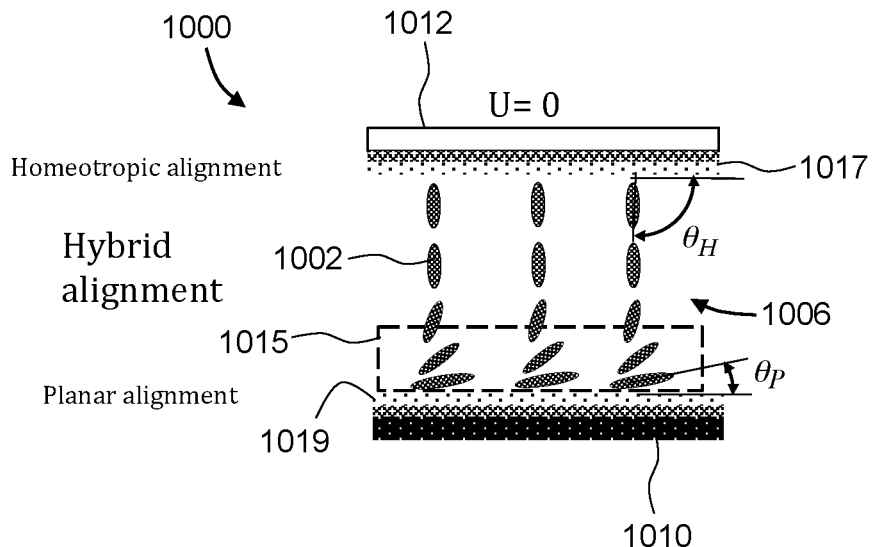
FIGS. 10A and 10B are schematic cross-sectional views of an embodiment of the LC device of FIG. 1 with a hybrid alignment of LC molecules before and after application of voltage, respectively.

Mixed-type or hybrid LC configurations are also possible. By way of a non-limiting example, referring to FIG. 10A, a hybrid LC cell 1000 includes bottom 1010 and top 1012 reflective substrates. The top surface of an LC layer 1006 has a homeotropic alignment of LC molecules 1002 having a positive dielectric anisotropy. The alignment of the LC molecules proximate to the top reflective substrate 1012 is defined by a homeotropic alignment layer 1017, which causes nearby LC molecules 1002 to become oriented substantially perpendicular to the homeotropic alignment layer 1017 in absence of applied voltage, e.g. with a pretilt angle $\theta_H$ of greater than 85 degrees. The bottom surface of the LC cell 1000 has a planar alignment of the LC molecules 1002 defined by a planar alignment layer 1019, at which the boundary LC molecules 1002 are oriented nearly parallel to the planar alignment layer 1019 in a boundary area 1015 when no voltage is applied, e.g. with a pretilt angle $\theta_P$ of less than 10 degrees. The configuration of the hybrid LC cell 1000 may be reversed, i.e. the bottom interface of the LC layer 1006 may be aligned homeotropically in the absence of electric field, and the top interface of the LC layer 1006 may have a planar alignment with a small pretilt angle.

Figure 10B:
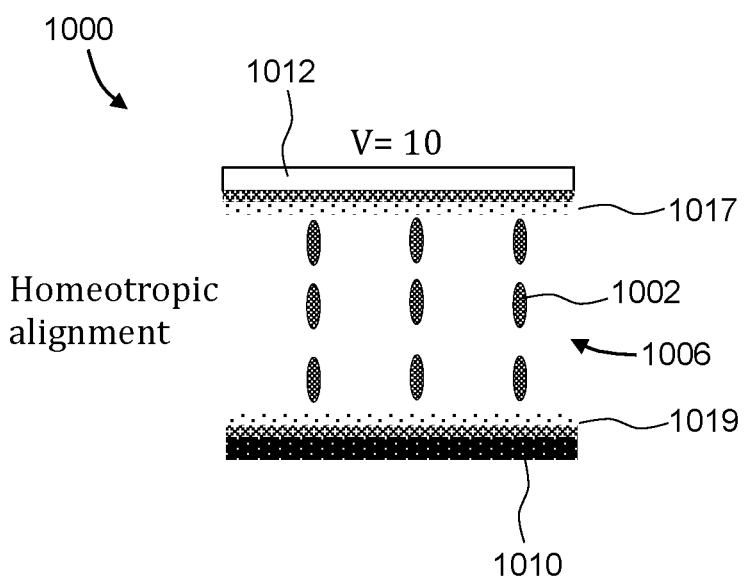

FIG. 10B shows the LC molecules 1002 orientation when a 10V voltage is applied across the hybrid LC cell 1000. At 10V of applied voltage, the bottom LC molecules 1002 are oriented vertically, such that the LC molecules 1002 are oriented vertically or nearly vertically across the entire LC layer 1006. The switchable part of the LC cell 1000 of FIGS. 10A and 10B (area 1015 in FIG. 10A) may be considerably thinner than that of the LC cell 900 of FIGS. 9A-9C, with the same type of LC fluid. This may be advantageous for reduction of the inter-pixel crosstalk at smaller pixel pitches, because the fringe fields are not going to considerably affect orientation of the LC molecules 1002 near the top reflective substrate 1012. It is noted that the LC cell 900 of FIGS. 9A to 9C may also be thinned when driven in such a manner that only thin near-electrode LC sub-layers are switched, e.g. when driving the LC cell 900 between 5V and 20V of driving voltage.

Various LC fluid types may be used in LC devices described herein. By way of non-limiting examples, nematic LC with $\Delta\epsilon>0$ (positive dielectric anisotropy) may include E7, E44, E49, ZLI-2293, MLC-12100-000, MLC-7500-000, TL-205, TL-213, etc., manufactured by Merck & Co., Inc. Nematic LC with $\Delta\epsilon<0$ (negative dielectric anisotropy) may include MLC-6608, MLC-6609, MLC-66010 etc., manufactured by Merck & Co., Inc. Dual-frequency nematic LCs, having $\Delta\epsilon>0$ below some critical frequency $f_c$ and $\Delta\epsilon<0$ for $f>f_c$, may also be used. An example of a dual-frequency LC is MLC 2048 manufactured by Merck & Co., Inc. In some embodiments, ferroelectric LCs operating, for example, in deformed-helix FLC (DH-FLC) mode or Kerr effect mode, may be used. Cholesteric polymer stabilized blue phase mode LCs may also be employed in some cases.

LC devices described herein may be used in a variety of applications. Tight pixel pitch afforded by the resonant configuration and associated small cell gap are useful in such applications as a configurable hologram, i.e. a phase-only or phase-and-amplitude spatial light modulator with a submicron pixel pitch configured for operation in a holographic projector of a 3D holographic display, for example. Tight pitch may also allow optical beam steering by a large steering angle, e.g. 60 degrees or more. Such a large steering angle may be required, for example, in a scanning projector display including a scanning projector near-eye display, and/or in a generic beam scanner usable in a barcode scanner, LIDAR, 3D mapper, etc. A spatial light modulator based on an LC device disclosed herein may be used for generation of pre-determined, dynamically switchable light patterns, such as structured light usable in 3D mapping applications, etc.

In a broader aspect, a steep and/or high-range variation of optical phase may be afforded by placing an electrically responsive LC layer in any of the configurations disclosed herein, a nematic LC layer, a ferroelectric LC layer, etc., in an optical cavity configured to provide multiple passes of a light beam across the LC layer. Also, in a broader aspect, an electrically responsive LC layer may be configured to have an optical resonance at a certain value of an electrical signal applied to the LC layer. For example, resonant particles, such as nanostructured particles having a plasmon resonance at a pre-determined wavelength, may be placed into an electrically responsive LC layer to effectively magnify the phase response of the LC layer. Another option is to provide resonant dielectric nanostructures filled with liquid crystal. Many other configurations are possible.

Figure 11:
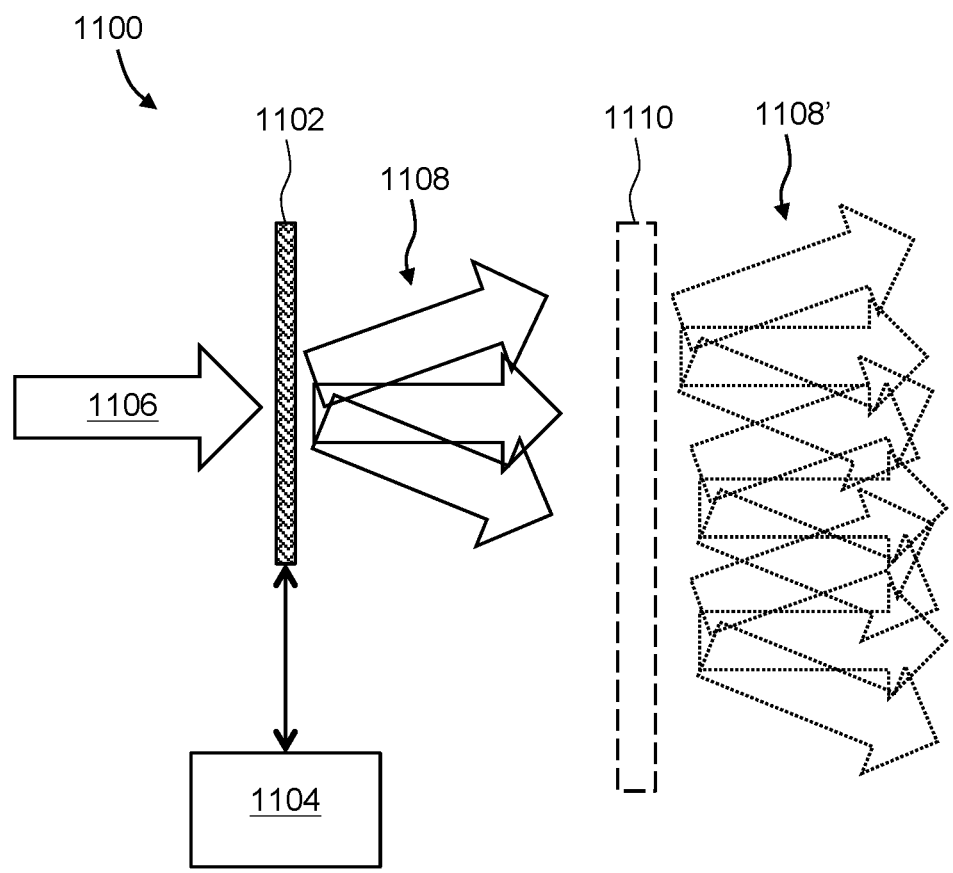
FIG. 11 is a schematic view of a configurable hologram based on an LC device of this disclosure.

Referring to FIG. 11, a configurable hologram 1100 includes a resonant LC device 1102, such as, for example, the LC device 100 of FIG. 1, the resonant multipass reflective LC cell 400 of FIG. 4, or the tunable LC devices 700A, 700B, 700C of FIGS. 7A, 7B, and 7C respectively, etc. The resonant LC device 1102 is operably coupled to a controller 1104. The resonant LC device 1102 has a sub-micron pixel pitch, e.g. less than 600 nm, less than 400 nm, less than 300 nm, or less than 200 nm, with kilohertz refresh rate, both afforded by the thin cell gap in a resonant optical cavity. The controller 1104 may be configured to obtain an image of a 3D object to be displayed to a viewer, and to obtain a digital holographic frame, e.g. by performing optical interference computations of a light field scattered by the 3D object with a simulated reference light beam having some pre-defined characteristics. Then, the controller 1104 may configure the resonant LC device 1102 to display the frame containing the digital hologram, by setting individual pixels of the resonant LC device 1102 to the values of phase delay and/or attenuation corresponding to an actual hologram that may have been obtained in a holographic recording setup involving illumination of the 3D object with a light beam, and simulating optical interference of the scattered light with the light beam, the light beam having characteristics used by the controller 1104 to perform the computation. When the resonant LC device 1102 is illuminated with an actual light beam 1106 having the same or similar characteristics, a holographic image 1108 results that may be observed by a user. In some embodiments, optional pupil-replicating waveguide 1110 may be used to provide multiple offset copies 1108' of the angular distribution of light corresponding to the holographic image 1108, for convenience of observation.

Figure 12:
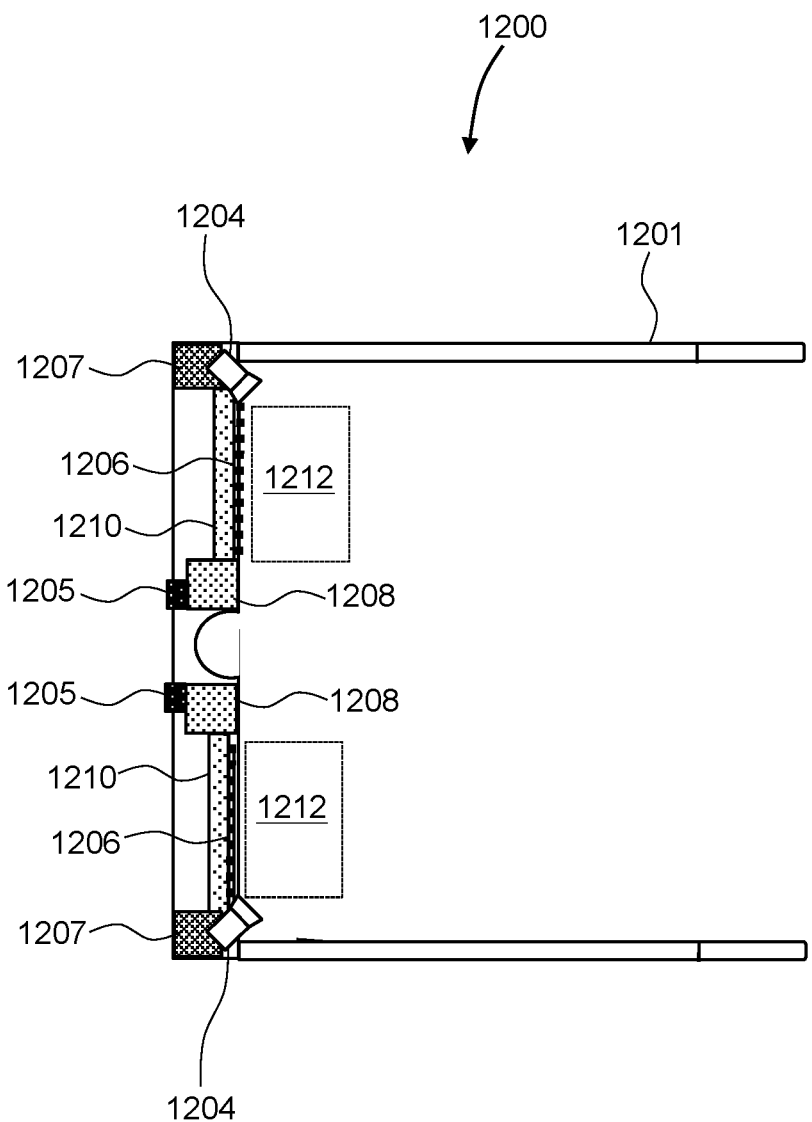
FIG. 12 is a schematic view of a near-eye display using an LC device of this disclosure to generate virtual imagery.

Turning to FIG. 12, an near-eye display 1200 includes a frame 1201 having a form factor of a pair of eyeglasses. The frame 1201 supports, for each eye: a light source 1205, a spatial light modulator 1208 optically coupled to the light source 1205, a pupil-replicating waveguide 1210 optically coupled to the projector 1208, an eye-tracking camera 1204, a plurality of illuminators 1206, and an eye-tracking camera controller 1207. The illuminators 1206 (FIG. 12) may be supported by the pupil-replicating waveguide 1210 for illuminating an eyebox 1212. The spatial light modulator 1208 may include any of the tunable LC devices disclosed herein, for example the configurable hologram 1100 of FIG. 11. A light beam provided by the light source 1205 diffracts in the spatial light modulator 1208 forming a fan of light beams carrying an image in angular domain to be projected into a user's eye. The pupil-replicating waveguide 1210 receives the fan of light beams and provides multiple laterally offset parallel copies of each beam of the fan of light beams, thereby extending the projected image over the eyebox 1212. The eyebox 1212 is a geometrical area where an image of acceptable quality is formed for observation by the eye of a user. For augmented reality (AR) applications, the pupil-replicating waveguide 1210 can be transparent to enable the user to view the outside world together with the images projected into each eye and superimposed with the outside world view.

The purpose of the eye-tracking cameras 1204 is to determine position and/or orientation of both eyes of the user. Once the position and orientation of the user's eyes are known, a gaze convergence distance and direction may be determined. The imagery generated by the spatial light modulator 1208 may be adjusted dynamically to account for the user's gaze, for a better fidelity of immersion of the user into the displayed augmented reality scenery, and/or to provide specific functions of interaction with the augmented reality.

The illuminators 1206 may be disposed on the periphery of the pupil-replicating waveguide 1210 so as not to impede the outside world view, or within the field of view, in an inconspicuous manner. In operation, the illuminators 1206 illuminate the eyes at the corresponding eyeboxes 1212, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1212.

The function of the eye-tracking camera controllers 1207 is to process images obtained by the eye-tracking cameras 1204 to determine, in real time, the eye gazing directions of both eyes of the user. In some embodiments, the image processing and eye position/orientation determination functions may be performed by a central controller, not shown, of the near-eye display 1200. The central controller may also provide control signals to the spatial light modulators 1208 to generate the images to be displayed to the user, depending on the determined eye positions, eye orientations, gaze directions, eyes vergence, etc. It is to be noted that the near-eye display 1200 is but one example of a visual display in which the resonant tunable LC devices of this disclosure may be used. Other types of visual displays using the resonant tunable LC devices include projection displays, display panels, etc.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 13A:
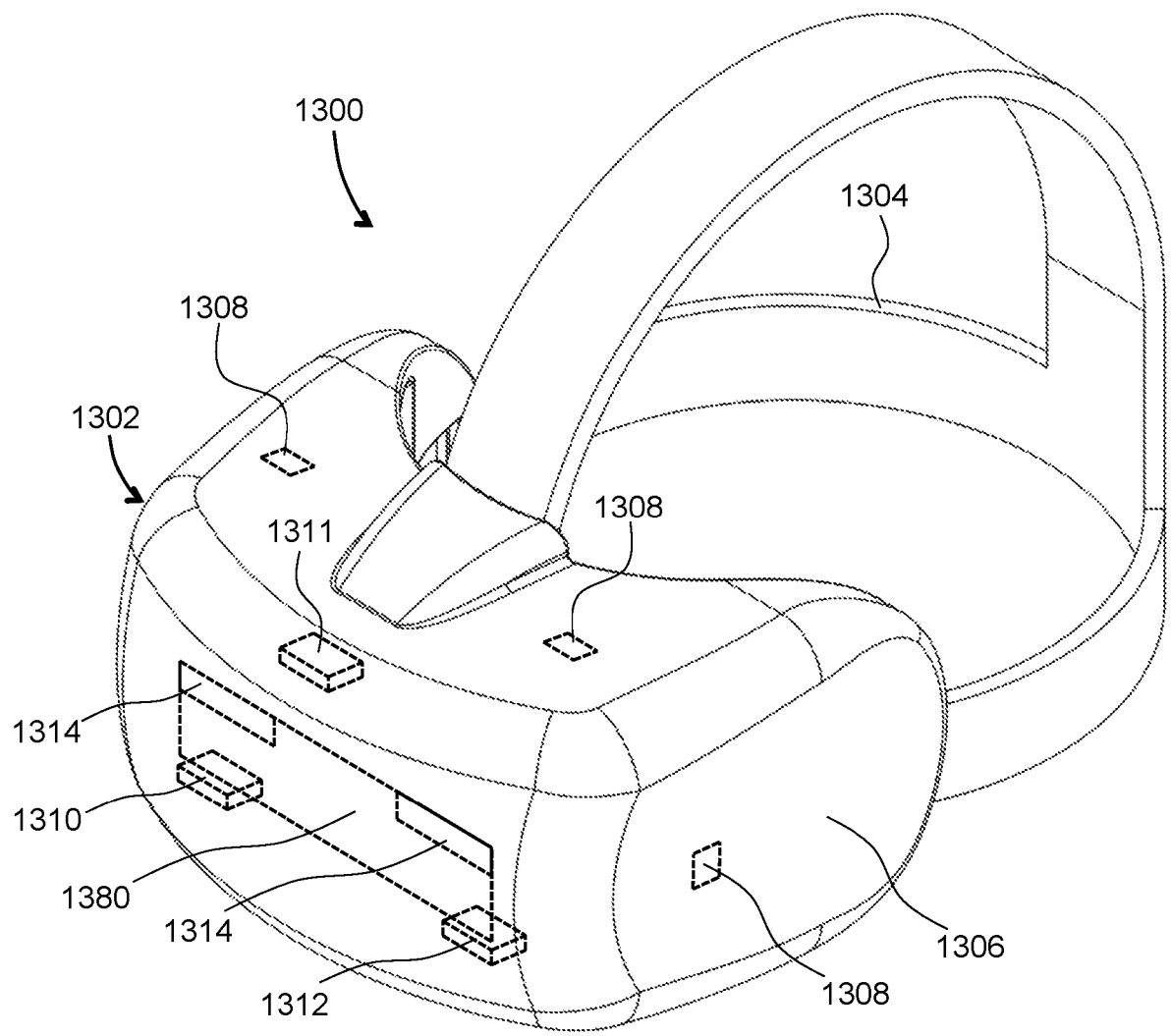
FIG. 13A is an isometric view of a head-mounted display of this disclosure.

Referring to FIG. 13A, an HMD 1300 is an example of an AR/VR wearable display system which encloses the user's face, for a greater degree of immersion into the AR/VR environment. The HMD 1300 may use any of the LC devices disclosed herein. The function of the HMD 1300 is to augment views of a physical, real-world environment with computer-generated imagery, and/or to generate the entirely virtual 3D imagery. The HMD 1300 may include a front body 1302 and a band 1304. The front body 1302 is configured for placement in front of eyes of a user in a reliable and comfortable manner, and the band 1304 may be stretched to secure the front body 1302 on the user's head. A display system 1380 may be disposed in the front body 1302 for presenting AR/VR imagery to the user. The display system 1380 may include the configurable hologram 1100 of FIG. 11, for example. Sides 1306 of the front body 1302 may be opaque or transparent.

In some embodiments, the front body 1302 includes locators 1308 and an inertial measurement unit (IMU) 1310 for tracking acceleration of the HMD 1300, and position sensors 1312 for tracking position of the HMD 1300. The IMU 1310 is an electronic device that generates data indicating a position of the HMD 1300 based on measurement signals received from one or more of position sensors 1312, which generate one or more measurement signals in response to motion of the HMD 1300. Examples of position sensors 1312 include: one or more accelerometers, one or more gyroscopes, one or more magnetometers, another suitable type of sensor that detects motion, a type of sensor used for error correction of the IMU 1310, or some combination thereof. The position sensors 1312 may be located external to the IMU 1310, internal to the IMU 1310, or some combination thereof.

The locators 1308 are traced by an external imaging device of a virtual reality system, such that the virtual reality system can track the location and orientation of the entire HMD 1300. Information generated by the IMU 1310 and the position sensors 1312 may be compared with the position and orientation obtained by tracking the locators 1308, for improved tracking accuracy of position and orientation of the HMD 1300. Accurate position and orientation is important for presenting appropriate virtual scenery to the user as the latter moves and turns in 3D space.

The HMD 1300 may further include a depth camera assembly (DCA) 1311, which captures data describing depth information of a local area surrounding some or all of the HMD 1300. To that end, the DCA 1311 may include a laser radar (LIDAR), or a similar device. The depth information may be compared with the information from the IMU 1310, for better accuracy of determination of position and orientation of the HMD 1300 in 3D space.

The HMD 1300 may further include an eye tracking system 1314 for determining orientation and position of user's eyes in real time. The obtained position and orientation of the eyes also allows the HMD 1300 to determine the gaze direction of the user and to adjust the image generated by the display system 1380 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1302.

Figure 13B:
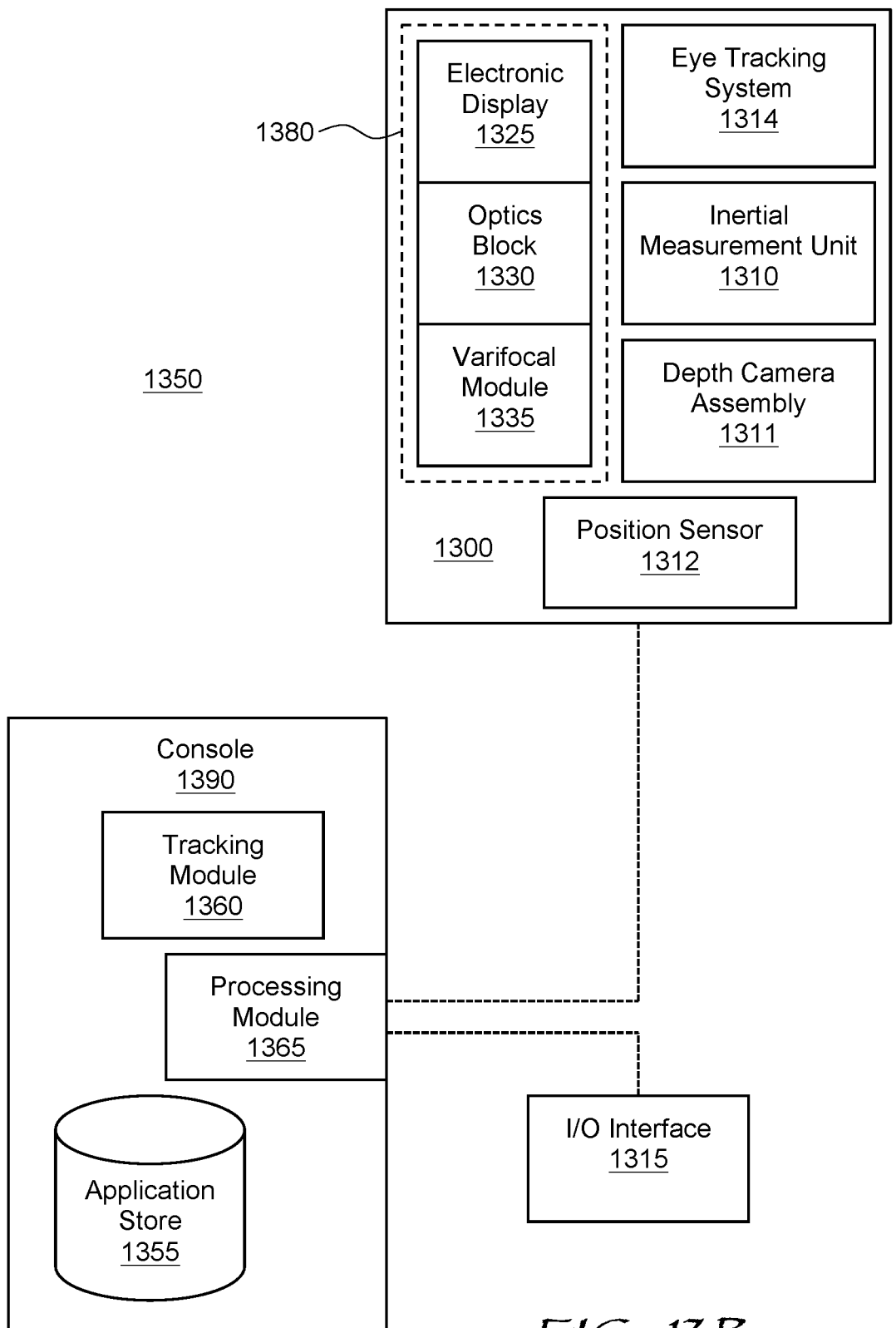
FIG. 13B is a block diagram of a virtual reality system including the headset of FIG. 13A.

Referring to FIG. 13B, an AR/VR system 1350 includes the HMD 1300 of FIG. 13A, an external console 1390 storing various AR/VR applications, setup and calibration procedures, 3D videos, etc., and an input/output (I/O) interface 1315 for operating the console 1390 and/or interacting with the AR/VR environment. The HMD 1300 may be "tethered" to the console 1390 with a physical cable, or connected to the console 1390 via a wireless communication link such as Bluetooth®, Wi-Fi, etc. There may be multiple HMDs 1300, each having an associated I/O interface 1315, with each HMD 1300 and I/O interface(s) 1315 communicating with the console 1390. In alternative configurations, different and/or additional components may be included in the AR/VR system 1350. Additionally, functionality described in conjunction with one or more of the components shown in FIGS. 13A and 13B may be distributed among the components in a different manner than described in conjunction with FIGS. 13A and 13B in some embodiments. For example, some or all of the functionality of the console 1390 may be provided by the HMD 1300, and vice versa. The HMD 1300 may be provided with a processing module capable of achieving such functionality.

As described above with reference to FIG. 13A, the HMD 1300 may include the eye tracking system 1314 (FIG. 13B) for tracking eye position and orientation, determining gaze angle and convergence angle, etc., the IMU 1310 for determining position and orientation of the HMD 1300 in 3D space, the DCA 1311 for capturing the outside environment, the position sensor 1312 for independently determining the position of the HMD 1300, and the display system 1380 for displaying AR/VR content to the user. The display system 1380 includes (FIG. 13B) an electronic display 1325, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1380 further includes an optics block 1330, whose function is to convey the images generated by the electronic display 1325 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1380 may further include a varifocal module 1335, which may be a part of the optics block 1330. The function of the varifocal module 1335 is to adjust the focus of the optics block 1330 e.g. to compensate for vergence-accommodation conflict, to correct for vision defects of a particular user, to offset aberrations of the optics block 1330, etc.

The I/O interface 1315 is a device that allows a user to send action requests and receive responses from the console 1390. An action request is a request to perform a particular action. For example, an action request may be an instruction to start or end capture of image or video data or an instruction to perform a particular action within an application. The I/O interface 1315 may include one or more input devices, such as a keyboard, a mouse, a game controller, or any other suitable device for receiving action requests and communicating the action requests to the console 1390. An action request received by the I/O interface 1315 is communicated to the console 1390, which performs an action corresponding to the action request. In some embodiments, the I/O interface 1315 includes an IMU that captures calibration data indicating an estimated position of the I/O interface 1315 relative to an initial position of the I/O interface 1315. In some embodiments, the I/O interface 1315 may provide haptic feedback to the user in accordance with instructions received from the console 1390. For example, haptic feedback can be provided when an action request is received, or the console 1390 communicates instructions to the I/O interface 1315 causing the I/O interface 1315 to generate haptic feedback when the console 1390 performs an action.

The console 1390 may provide content to the HMD 1300 for processing in accordance with information received from one or more of: the IMU 1310, the DCA 1311, the eye tracking system 1314, and the I/O interface 1315. In the example shown in FIG. 13B, the console 1390 includes an application store 1355, a tracking module 1360, and a processing module 1365. Some embodiments of the console 1390 may have different modules or components than those described in conjunction with FIG. 13B. Similarly, the functions further described below may be distributed among components of the console 1390 in a different manner than described in conjunction with FIGS. 13A and 13B.

The application store 1355 may store one or more applications for execution by the console 1390. An application is a group of instructions that, when executed by a processor, generates content for presentation to the user. Content generated by an application may be in response to inputs received from the user via movement of the HMD 1300 or the I/O interface 1315. Examples of applications include: gaming applications, presentation and conferencing applications, video playback applications, or other suitable applications.

The tracking module 1360 may track movements of the HMD 1300 or of the I/O interface 1315, the IMU 1310, or some combination thereof. For example, the tracking module 1360 may determine a position of a reference point of the HMD 1300 in a mapping of a local area based on information from the HMD 1300. The tracking module 1360 may also determine positions of the reference point of the HMD 1300 or a reference point of the I/O interface 1315 using data indicating a position of the HMD 1300 from the IMU 1310 or using data indicating a position of the I/O interface 1315 from an IMU included in the I/O interface 1315, respectively. Furthermore, in some embodiments, the tracking module 1360 may use portions of data indicating a position or the HMD 1300 from the IMU 1310 as well as representations of the local area from the DCA 1311 to predict a future location of the HMD 1300. The tracking module 1360 provides the estimated or predicted future position of the HMD 1300 or the I/O interface 1315 to the processing module 1365.

The processing module 1365 may generate a 3D mapping of the area surrounding some or all of the HMD 1300 ("local area") based on information received from the HMD 1300. In some embodiments, the processing module 1365 determines depth information for the 3D mapping of the local area based on information received from the DCA 1311 that is relevant for techniques used in computing depth. In various embodiments, the processing module 1365 may use the depth information to update a model of the local area and generate content based in part on the updated model.

The processing module 1365 executes applications within the AR/VR system 1350 and receives position information, acceleration information, velocity information, predicted future positions, or some combination thereof, of the HMD 1300 from the tracking module 1360. Based on the received information, the processing module 1365 determines content to provide to the HMD 1300 for presentation to the user. For example, if the received information indicates that the user has looked to the left, the processing module 1365 generates content for the HMD 1300 that mirrors the user's movement in a virtual environment or in an environment augmenting the local area with additional content. Additionally, the processing module 1365 performs an action within an application executing on the console 1390 in response to an action request received from the I/O interface 1315 and provides feedback to the user that the action was performed. The provided feedback may be visual or audible feedback via the HMD 1300 or haptic feedback via the I/O interface 1315.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A tunable liquid crystal (LC) device comprising:
   a first substrate;
   a full reflector over the first substrate, the full reflector comprising a first electrode layer;
   an LC layer over the full reflector;
   a partial reflector over the LC layer, the partial reflector having a reflectivity of at least 6% and comprising a second electrode layer; and
   a second substrate over the partial reflector;

wherein the LC layer is tunable by applying an electrical signal to at least one of the first or second electrode layers.

2. The tunable LC device of claim 1, wherein the first substrate comprises a silicon substrate supporting a circuitry for providing the electrical signal for tuning the LC layer.

3. The tunable LC device of claim 1, wherein the LC layer comprises a nematic LC with positive dielectric anisotropy, the LC device further comprising:
- a first alignment layer between the full reflector and the LC layer; and
- a second alignment layer between the LC layer and the partial reflector;
- wherein the first and second alignment layers are configured to uniformly align the LC with a pretilt angle of less than 10 degrees.

4. The tunable LC device of claim 1, wherein the LC layer comprises a nematic LC with negative dielectric anisotropy, the LC device further comprising:
- a first alignment layer between the full reflector and the LC layer; and
- a second alignment layer between the LC layer and the partial reflector;
- wherein the first and second alignment layers are configured to homeotropically align the LC with a pretilt angle of greater than 85 degrees.

5. The tunable LC device of claim 1, wherein the LC layer comprises a nematic LC with positive dielectric anisotropy, the LC device further comprising:
- a first alignment layer between the full reflector and the LC layer; and
- a second alignment layer between the LC layer and the partial reflector;
- wherein the first alignment layer is configured to align the LC with a first pretilt angle of less than 10 degrees, and the second alignment layer is configured to align the LC with a second pretilt angle of greater than 85 degrees, causing the LC to adopt a hybrid orientational configuration.

6. The tunable LC device of claim 1, wherein the LC layer has a thickness of 2 micrometers or less.

7. The tunable LC device of claim 1, wherein a reflectivity of the partial reflector is less than a reflectivity of the full reflector minus a round-trip absorption loss in an optical cavity formed by the full and partial reflectors.

8. The tunable LC device of claim 1, wherein the partial reflector comprises a distributed Bragg reflector.

9. The tunable LC device of claim 1, wherein the partial reflector comprises a high-contrast subwavelength grating.

10. The tunable LC device of claim 1, wherein the partial reflector comprises a metasurface that comprises at least one of dielectric or metallic subwavelength structures.

11. The tunable LC device of claim 1, wherein the first electrode layer comprises an array of conductive layer segments, wherein at least some conductive layer segments of the array of conductive layer segments are independently energizable by applying electrical signals thereto.

12. The tunable LC device of claim 11, wherein the array of conductive layer segments has a pitch of 2 micrometers or less.

13. The tunable LC device of claim 11, wherein the array of conductive layer segments comprises a conductive oxide having at least 50% transmission of visible light.

14. The tunable LC device of claim 11, wherein at least some conductive layer segments of the array of conductive layer segments are reflective.

15. The tunable LC device of claim 11, wherein the full reflector further comprises a reflective layer supported by the first substrate, wherein each conductive layer segment of the array of conductive layer segments is supported by the reflective layer.

16. The tunable LC device of claim 15, wherein the reflective layer comprises at least one of: a distributed Bragg reflector; a subwavelength grating; or a metasurface comprising at least one of dielectric or metallic subwavelength structures.

17. A configurable hologram comprising the LC device of claim 1.

18. A system comprising:
- the LC device of claim 11;
- a light source coupled to the LC device for providing a light beam thereto, wherein the LC device is configured to spatially modulate the light beam in at least one of phase or amplitude by applying electrical signals to conductive layer segments of the array of conductive layer segments.

19. The system of claim 18, further comprising an optics block disposed downstream of the LC device and configured to redirect the spatially modulated light beam for forming an image.

* * * * *